Figure 10:
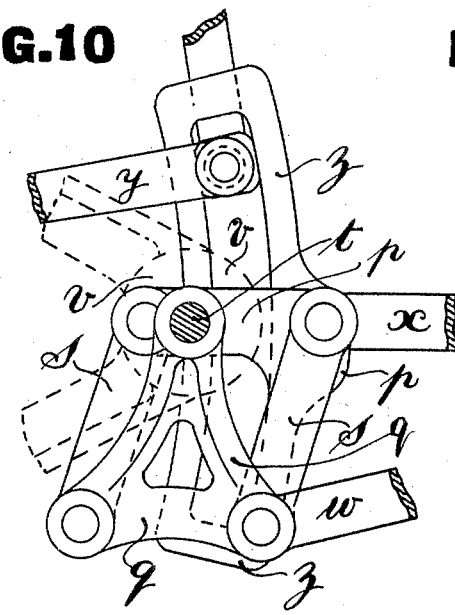

No. 777,672. PATENTED DEC. 20, 1904.
W. GADD.
VALVE GEAR.
APPLICATION FILED APR. 28, 1904.
NO MODEL. 5 SHEETS—SHEET 1.
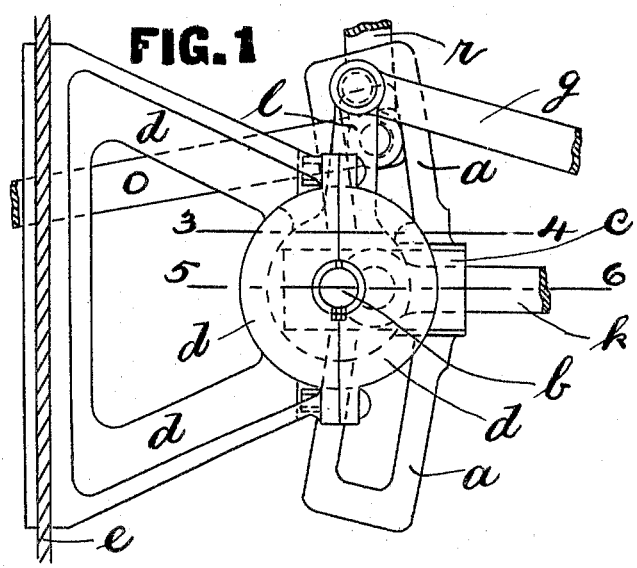
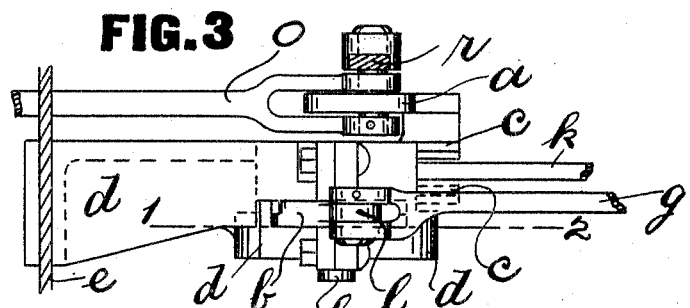
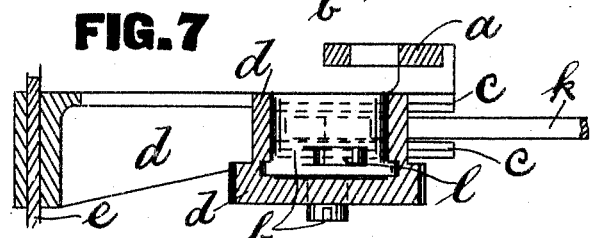
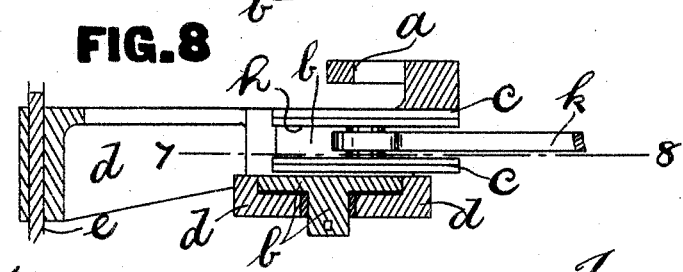
Witnesses.
Arthur Gadd.
George Frederick Gadd.
Inventor.
William Gadd.

No. 777,672. PATENTED DEC. 20, 1904.
W. GADD.
VALVE GEAR.
APPLICATION FILED APR. 28, 1904.
NO MODEL. 5 SHEETS—SHEET 2.
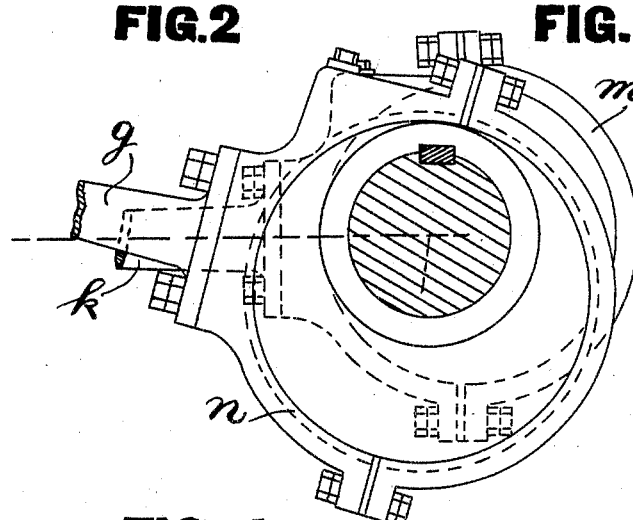
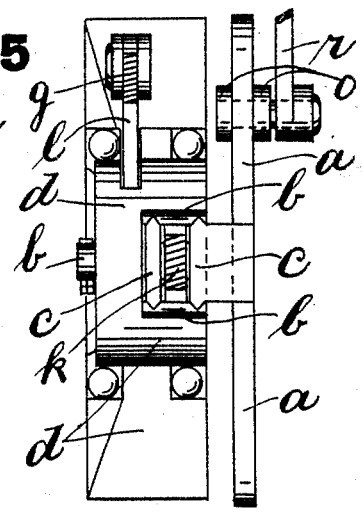
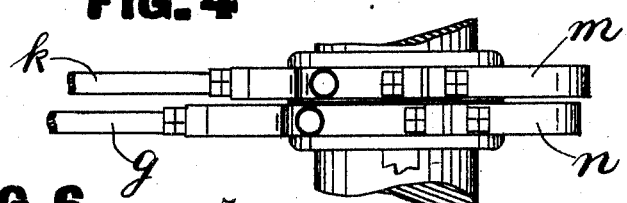
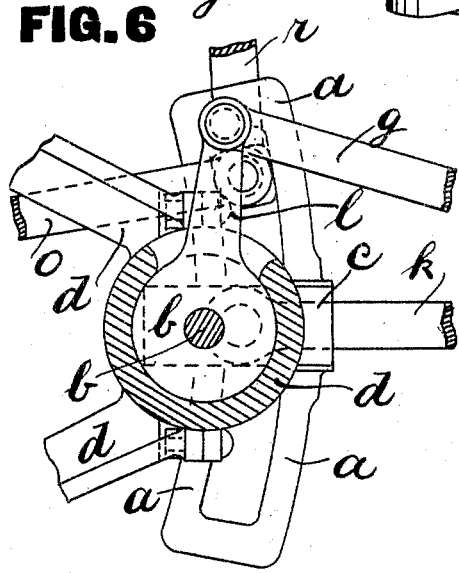
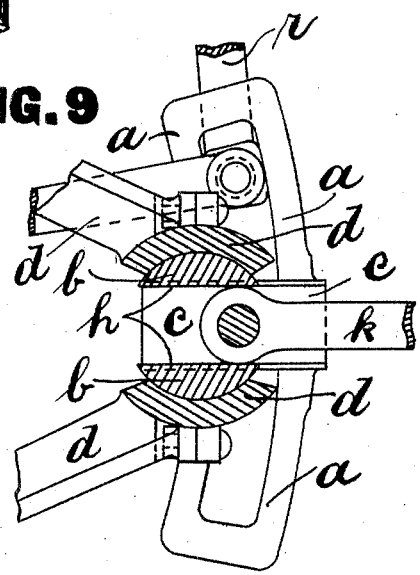
Witnesses
Arthur Gadd.
George Frederick Gadd.
Inventor.
William Gadd.

No. 777,672. PATENTED DEC. 20, 1904.
W. GADD.
VALVE GEAR.
APPLICATION FILED APR. 28, 1904.
NO MODEL. 5 SHEETS—SHEET 3.

Witnesses
Arthur Gadd.
George Frederick Gadd.

Inventor
William Gadd.

No. 777,672. PATENTED DEC. 20, 1904.
W. GADD.
VALVE GEAR.
APPLICATION FILED APR. 28, 1904.
NO MODEL. 5 SHEETS—SHEET 4.
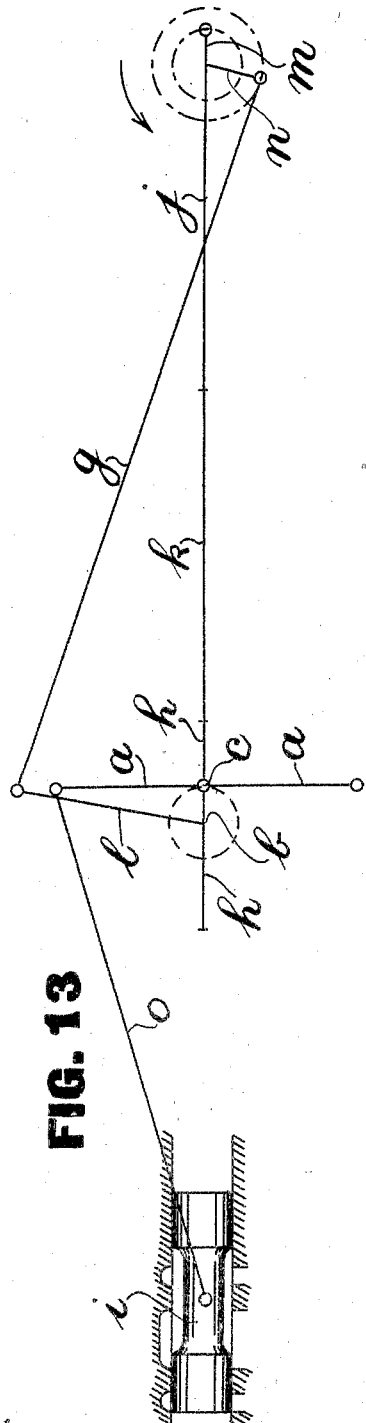
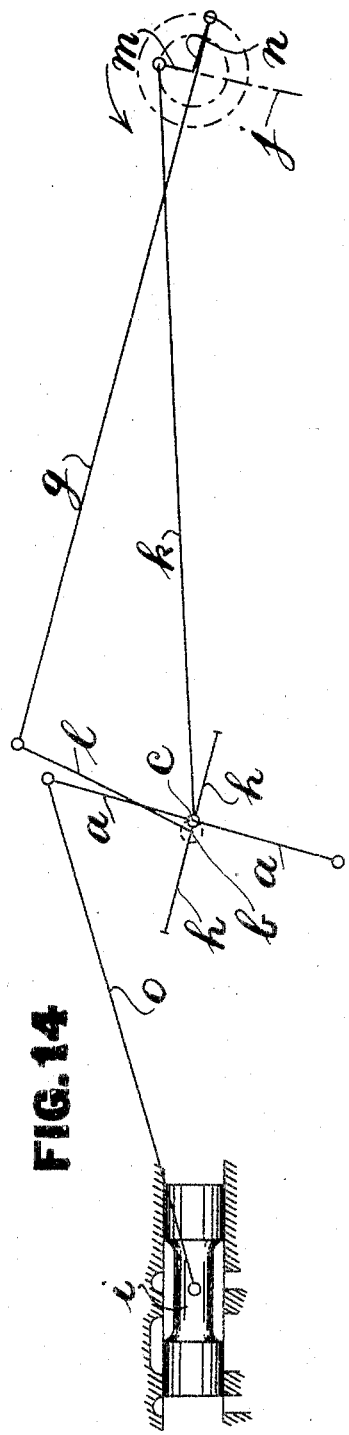
Witnesses.
Arthur Gadd.
George Frederick Gadd.
Inventor.
William Gadd.

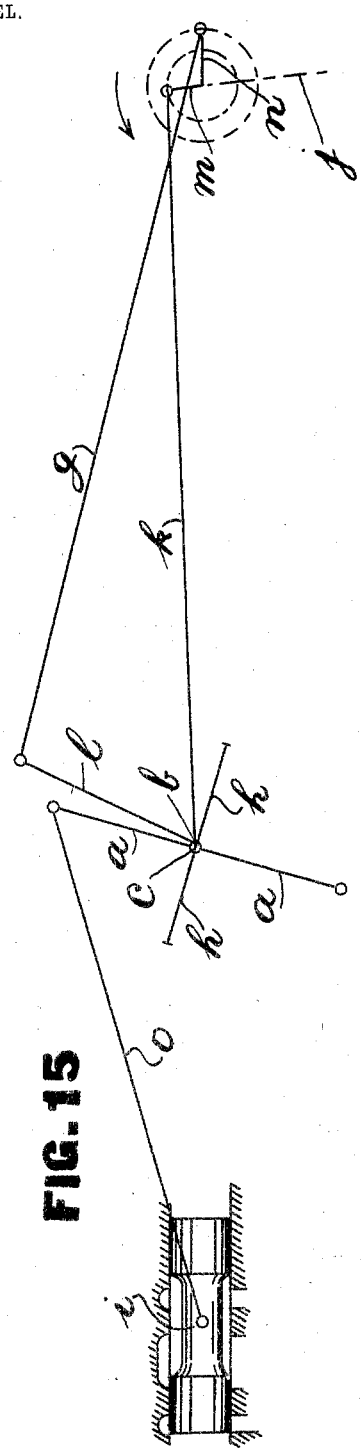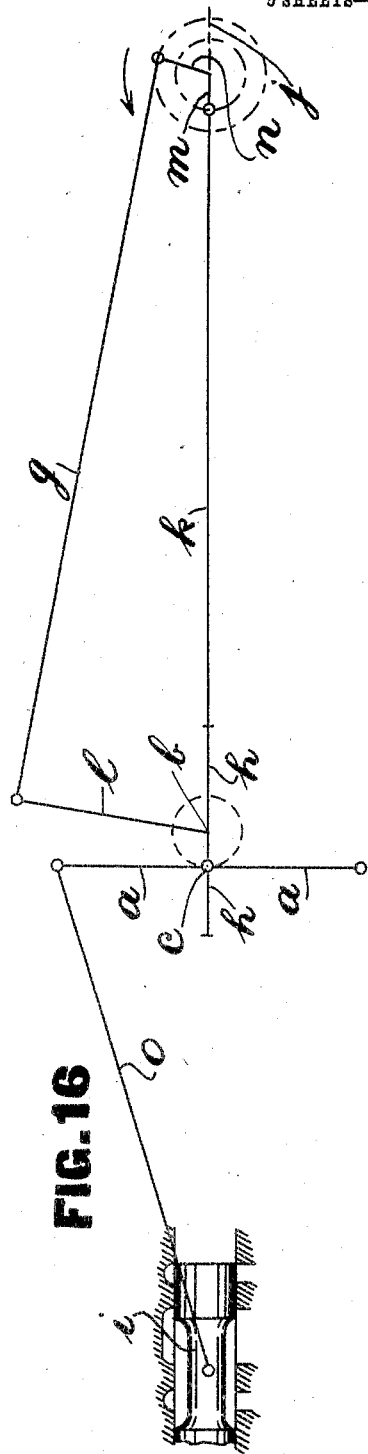

No. 777,672.                                              Patented December 20, 1904.

UNITED STATES PATENT OFFICE.

WILLIAM GADD, OF MANCHESTER, ENGLAND.

VALVE-GEAR.

SPECIFICATION forming part of Letters Patent No. 777,672, dated December 20, 1904.

Application filed April 28, 1904. Serial No. 205,361.

*To all whom it may concern:*

Be it known that I, WILLIAM GADD, a subject of the King of Great Britain, residing at 64 Barton Arcade, Manchester, in the county of Lancaster, England, have invented a new and useful Valve-Gear for Fluid-Pressure Engines, (for which I have made applications for patents in Great Britain, No. 11,335, bearing date May 19, 1903, and in Austria bearing date February 23, 1904,) of which the following is a specification.

The improvements relate to valve-gear for steam and other fluid pressure engines, more particularly reversing-engines, whether locomotive or stationary, and have for object a better distribution of steam or other fluid by the slide-valve with the means and in manner hereinafter to be described. To accomplish this and to effect my improvements, I provide in the case of a reversing-engine, such as a locomotive or winding engine, an oscillating reversing-link apparatus capable of turning, primarily, upon a fixed center, but composed of two parts, one of which is made capable of moving or sliding upon or within or otherwise carried by the other. The fixed center may be formed as a cross-shaft or a stud or any suitable fixed point of turn. The first part of the oscillating link aforesaid turns upon or about this fixed center and is provided with a lever-arm to which one of the two eccentric-rods is connected to oscillate or operate the same. To enable the second part of the link to move or slide upon or within the first, I by preference form the first or oscillating part with a slide or slides placed so as to cross the center at or about right angles to the operative lever-arm. Within or upon this slide or slides the second part of the link apparatus, which is formed with or as the reversing-arc, is capable of sliding to and fro upon or within the oscillating part, preferably from side to side of the oscillating center. This second and sliding part of the link is connected directly to and operated by the second eccentric-rod, with the result that such second part is caused to slide to and fro upon or within a rocking or cradle slide or equivalent, which motion of the one part while being carried by the other constantly varies the leverage or position of the link-arc, thereby compounding together in a special manner the motions of the two eccentrics. The eccentric directly actuating the reversing-arc in or on its slide moves the same over the middle portion of the valve's travel, while the oscillating part in conjunction therewith carries the valve the remainder of the distance at each end of such travel. The eccentrics are set to operate at about ninety degrees apart—that is to say, when one is at its extremity of throw the other is about at mid-throw. The valve-rod is connected to the arc in any well-known manner. By this means the throw of each eccentric may be greatly reduced from ordinary, in some cases to one-third, and yet obtain the same distance of travel for the valve as heretofore, and at the same time the speed of opening and closing the ports and the time of their remaining largely open are increased and other advantages in the distribution of steam over the ordinary eccentric-gear are obtained by simple and direct means and with smooth action.

That the invention may be better understood I will, with the aid of the accompanying drawings, proceed more fully to describe means employed by me.

Figure 11:
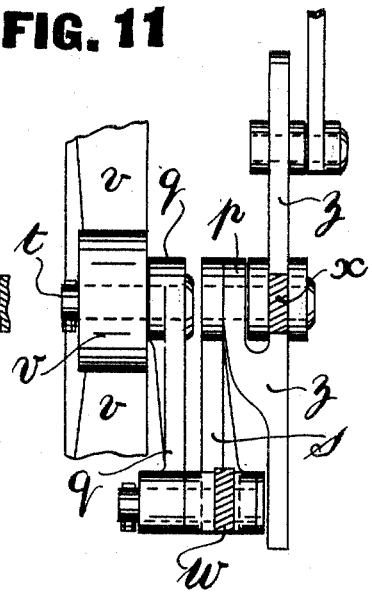
Figure 12:
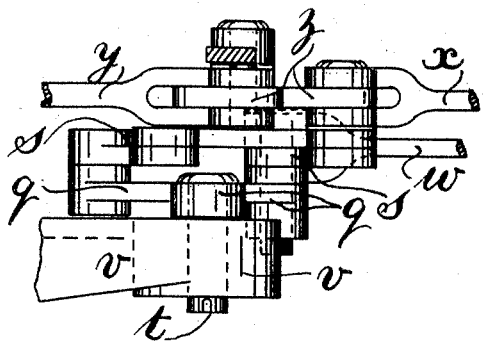

In the drawings, Figure 1 is an elevation, partly in section, of the link apparatus portion of a valve-gear arranged in accordance with one form of my invention; and Fig. 2 is a view in elevation and partly sectioned, showing a pair of eccentrics in position for driving the gear illustrated in Fig. 1. Figs. 3 and 4 are plan views, partly sectioned, of Figs. 1 and 2, respectively, while Fig. 5, also partly sectioned, is an end view of said Fig. 1. Fig. 6 is a sectional view through line 1 2 of Fig. 3. Figs. 7 and 8 are transverse sections, with portions left unsectioned, through lines 3 4 and 5 6, respectively, of Fig. 1, while Fig. 9 is a sectional view through line 7 8 of Fig. 8. Fig. 10 is an elevation, partly sectioned, but with a portion thereof shown with broken lines only for sake of clearness, of the link-apparatus portion of a valve-gear arranged in accordance with another and equivalent form of my invention, while Figs. 11 and 12 are respectively an end view and plan view, partly sectioned, of said Fig. 10. Figs. 13 to 16, inclusive, are diagrammatic views illustrating the action of the gear at positions corresponding with different points in the stroke of the piston.

The same letters indicate corresponding parts wherever they occur.

With reference to Figs. 1 to 9, inclusive, $a$ is the oscillating reversing-arc portion of the link apparatus, which as a whole is capable of turning primarily upon a fixed center, but is composed of two parts $b\ c$, one of which is capable of moving or sliding or being carried upon or within the other. The fixed center may be formed as a cross-shaft or a stud or any suitable fixed point of turn, but in the case shown is accomplished by providing bearings within a fixed bracket or support $d$, attached to a stretcher $e$ or portion of the frame of the locomotive or engine. The first part $b$ of the oscillating-link apparatus thus turns about a fixed center by being mounted within the bearings in the bracket $d$, and such portion $b$ is formed with a lever-arm $l$, to which the eccentric-rod $g$ is connected to operate or oscillate the same. To enable the second part $c$ of the link to move or slide or be carried upon or within the first and oscillating part $b$, I by preference form such first part with a slide or slides $h$, placed so as to cross the center at or about right angles to the operative lever-arm $l$, and the part $c$, forming a portion of the second or arc part $a$, is so formed as to be capable of sliding to and fro upon or within the oscillating part $b$ while the same is in motion, preferably from side to side of the oscillating center. This sliding part $c$ of the reversing-arc $a$ is connected directly to and operated by the second eccentric-rod $k$, with the result that such second part $c$, carrying the arc $a$, is caused to slide to and fro upon or within a rocking or cradle slide $h\ b$, which constantly varies the leverage or position of the link-arc relatively to the center of turn, thereby compounding together in a special manner the motions of the two eccentrics $m\ n$. The eccentric $m$, which directly actuates the reversing-arc $a$ in or on its oscillating slide, moves the same over the middle portion of the valve's travel or through a distance equal to twice the "lap" plus twice the "lead," while the oscillating part, in conjunction therewith, carries the valve the remainder of the distance at each end of such travel in order to fully open the ports to steam. The eccentrics are set to operate at about ninety degrees apart—that is to say, when one is at its extremity of throw the other is about at mid-throw.

The valve-rod $o$ is connected to the arc $a$ in any well-known manner.

A suspension-rod $r$ is shown for the purpose of enabling the direction of motion to be reversed when required, and I prefer such rod to swing equally on each side of the fixed center of turn of the rocking part $b$.

By the means described the throw of each eccentric may be greatly reduced from ordinary, in some cases to one-third, and yet obtain the same distance of travel for the valve as heretofore without inconvenience, and at the same time the speed of opening and closing the ports and the time of their remaining largely open are increased, and other advantages in the distribution of steam over the ordinary eccentric-gear are obtained by simple and direct means having few parts and with smooth action.

With reference to Figs. 10, 11, and 12, which show an equivalent device for the purpose of giving an equivalent motion to the arc $z$, as in the previous case described, the arc $z$ is provided with a portion $p$, which is capable of moving to and fro upon the first part $q$ by being carried on two swinging levers $s$, attached thereto, thus enabling the arc to be bodily translated from side to side of the rocking center, as in the former example of a slide. The first part $q$ is arranged to turn upon the fixed center at $t$ within a bracket or support $v$. $w$ and $x$ are the eccentric-rods for driving the first and second parts referred to, respectively, and $y$ is a valve-rod in connection with the arc $a$.

With regard to Figs. 13, 14, 15, and 16, and which more particularly refer to Figs. 1 to 9, inclusive, the gear is shown applied to a piston-valve $i$. For the sake of clearness the valve is assumed to be without lead, so that, as shown in Fig. 13, the said valve is about to open the left-hand steam-port when the crank $j$ is on the dead-center. At this point the link $a$ assumes a position perpendicular to the slide $h$, the center of such link being moved away from the fixed center of turn $b$ to a distance determined by the "throw" of the eccentric $m$. In Fig. 14 the left-hand port is fully open to steam, an effect produced by the tilting of the slide $h$ by the action of the eccentric $n$ and the movement along such slide in a contrary direction of the link $a$ by the action of the eccentric $m$. It is also to be observed that the radius of oscillatory movement of the link $a$ relatively to the fixed center $b$ thus varies, as shown by the broken circumferential lines about such center in the figures referred to. In Fig. 15 the center of the link $a$ coincides with the fixed center $b$, at which point the valve $i$ is here arranged to cut off steam or close the left-hand port. Fig. 16 shows the relative positions of the parts at the end of the stroke or opposite dead-center of the crank, when the right-hand port is about to be opened to steam, and a similar operation to that already described may take place in relation to such port.

It will thus be seen that it is an essential feature of the invention that both parts of the combined link system are moved around the one fixed center and that the reversing-arc portion is bodily moved nearer or farther to or from such fixed center on either side thereof, and thereby constantly varies the leverage and angularity of the arc in its movements about the fixed center.

Variations in detail may be made, such as the dimensions of the oscillating lever-arm and eccentric therefor, the form of slide or slides, or equivalent means for carrying the arc part to be translated to and fro upon or within the oscillating part, together with the design of the parts and the position of the fixed center, and in some cases the oscillating portion may be inverted, and the invention may be applied to non-reversing engines without departing from the peculiar character of the invention.

Having now particularly described and ascertained the nature of my said invention and in what manner the same is to be performed, I declare that what I claim is—

In valve-gear for fluid-pressure engines, a link apparatus composed of two main parts, an oscillatory portion and a translatory portion carried thereby, the oscillatory portion being oscillated upon a fixed center, and the translatory portion independently traversed in relation thereto, for the purpose and in manner substantially as herein set forth.

WILLIAM GADD.

Witnesses:
ARTHUR GADD,
GEORGE FREDERICK GADD.